United States Patent [19]

Andoh

[11] Patent Number: 5,033,078
[45] Date of Patent: Jul. 16, 1991

[54] COMMUNICATION APPARATUS INCLUDING FACSIMILE AND TELEPHONE FUNCTIONS

[75] Inventor: Akitake Andoh, Nara, Japan

[73] Assignee: Sharp Kabushiki Kaisha, Osaka, Japan

[21] Appl. No.: 407,926

[22] Filed: Sep. 15, 1989

[30] Foreign Application Priority Data

Sep. 17, 1988 [JP] Japan .......................... 63-121924[U]

[51] Int. Cl.⁵ ..................... H04M 1/272; H04M 11/08
[52] U.S. Cl. ...................................... 379/100; 379/355
[58] Field of Search ............... 379/216, 355, 354, 356, 379/357, 359, 93, 100

[56] References Cited

U.S. PATENT DOCUMENTS 4,567,326 1/1986 Sato et al. ........................... 379/355
4,764,951 8/1988 Kotani et al. .................... 379/355 X Primary Examiner—James L. Dwyer

[57] ABSTRACT

A communication apparatus performs setting and cancelling of a compressed dial number mode by detecting the state, on-hook or off-hook, of a handset by use of a hook state detecting device. When the handset is in on-hook state, a compressed dial number mode is selected. By operating the dial number keys to enter a compressed dial number in the on-hook state, corresponding destination telephone number are read out of a memory and a calling operation is performed.

3 Claims, 4 Drawing Sheets

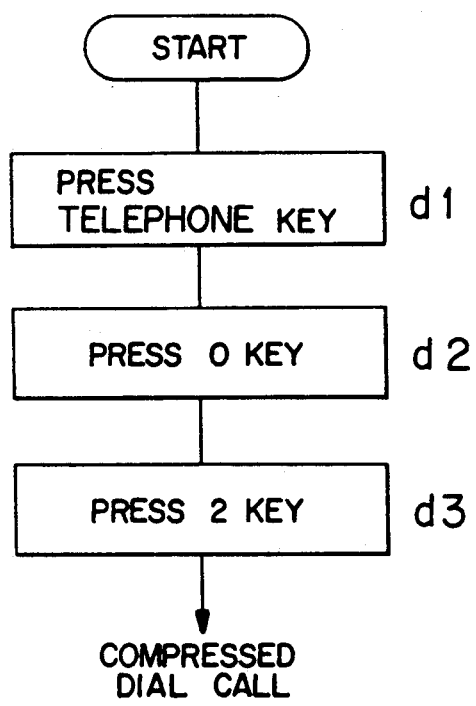
FIG. 4 (1)
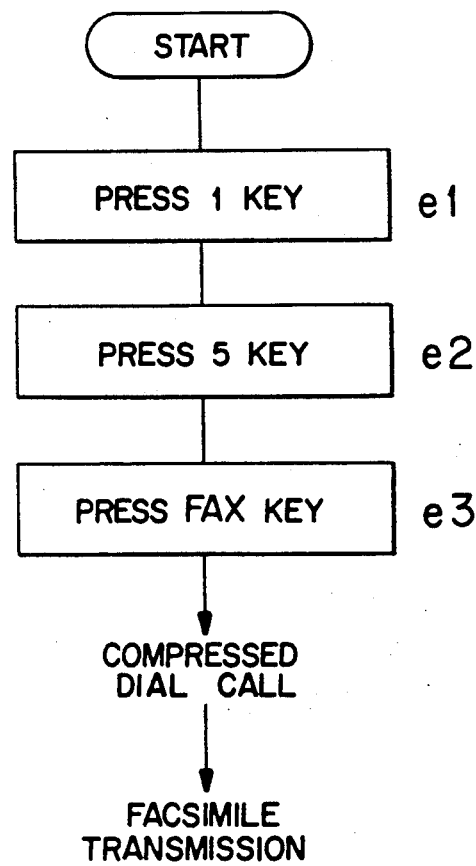
FIG. 4 (2)

COMMUNICATION APPARATUS INCLUDING FACSIMILE AND TELEPHONE FUNCTIONS

BACKGROUND OF THE INVENTION

1. Field of the Invention

This invention relates to a communication apparatus which utilizes a telephone line and is used, for example, as a facsimile transmission apparatus or the like which is provided with telephone functions.

2. Description of the Prior Art

Some communication apparatuses which utilize a telephone line, such as telephone sets and facsimile transmission apparatus, have a function called the repertory dialing. The repertory dialing is used to store, in a memory provided in the telephone set or the like, pairs of numbers, of two digits for example, called the compressed dial number and destination telephone number. These numbers are made to correspond to each other thereby to perform telephone calling operation by entering one of the compressed dial numbers corresponding to the desired destination telephone number. Thus telephone number dialing operation is simplified for telephone set or the like.

FIG. 1 shows a flow chart indicating an example of a calling operation procedure for a facsimile transmission apparatus which is provided with telephone function. FIG. 1(1) shows an example of calling operation by means of the compressed dial number. At step a1 TELEPHONE key is pressed to select telephone mode. At step a2 COMPRESSED key is pressed to select the repertory dialing mode. When the "0" key is pressed at step a3 and then the "2" key is pressed at step a4, a dial call is placed for the destination telephone number corresponding to the compressed dial number "02".

FIG. 1(2) shows an example of operation to perform facsimile a transmission by means of compressed dialing. At step b1 COMPRESSED key is pressed to select the compressed dialing mode. When "1" key is pressed at step b2, "5" key is pressed at step b3 and FAX key is pressed at step b4, a call is placed for the destination telephone number corresponding to the compressed dial number "15", followed by facsimile transmission being performed.

FIG. 1(3) shows an example of making telephone call by means of ordinary dial number keys. At step c1 a handset which incorporates a speaker and a microphone is lifted. At step c2 the destination telephone number is keyed in as it is, and the destination is called.

In the case of facsimile transmission apparatus of the prior art, calling operation by means of a compressed dial number either for telephone call or facsimile transmission has been rather complicated requiring four key strokes.

SUMMARY OF THE INVENTION

The objective of this invention is to provide a communication apparatus which utilizes the telephone line capable of accurate and quick key operation for making telephone call or facsimile transmission in a facsimile transmission apparatus which is equipped with telephone functions.

The invention relates to a communication apparatus utilizing a telephone line which comprises:

a memory which stores destination telephone numbers each paired with a corresponding number of relatively small number of digits, a hook state detecting means for detecting the handset states, on-hook or off-hook, a set of dial number keys for inputting the destination telephone numbers, and, when the dial number keys are operated in on-hook state, performs calling operation for the corresponding destination telephone number referring to the memory.

According to the invention, the memory stores the destination telephone numbers which are associated to corresponding numbers of relatively small number of digits, and the hook state detecting means detects whether the handset is in on-hook state or in off-hook state. In case the dial number keys for the entry of telephone numbers are operated in correspondence to a number of relatively small number of digits, call is placed for the destination telephone number which is stored in the memory in correspondence to the number of relatively small number of digits.

According to the invention, key input operation for telephone numbers in a communication apparatus utilizing a telephone line is made accurate and quick, thereby improving the operability of the communication apparatus.

In a preferred embodiment, the communication apparatus which utilizes telephone line performs telephone communication function by means of the handset.

In another preferred embodiment, the communication apparatus is provided with a facsimile transmission means and a set of keys operated to make facsimile transmission, where facsimile transmission is performed by operating the dial number key in on-hook state and then operating the keys for facsimile transmission function.

In a further preferred embodiment, the communication apparatus accomplishes the telephone communication function by means of the handset and incorporates a facsimile transmission means and a key operated to make facsimile transmission and a timer which performs time counting operation for a predetermined period of time since the completion of the dial number key operation in on-hook state. When the keys for the facsimile transmission have been operated during the time counting operation period of the timer, the facsimile transmission means is activated or, when the key for the facsimile transmission has not been operated during the time counting operation period of the timer, telephone communication function is activated.

BRIEF DESCRIPTION OF DRAWINGS

These objectives and other objectives, features and advantages of the invention will be understood more clearly with reference to the following detailed description and drawings.

FIGS. 4(1)–4(2) are flow charts explaining an example of key input operation in the communication apparatus 1 in FIG. 2.

DETAILED DESCRIPTION OF PREFERRED EMBODIMENTS

The following description explains in detail a preferred embodiment of the invention with reference to the drawings.

Figure 1:
FIGS. 1(1)–1(3) are flow charts explaining an example of key input in a communication apparatus of the prior art which utilizes telephone line.
Figure 1:
Figure 1:
Figure 2:
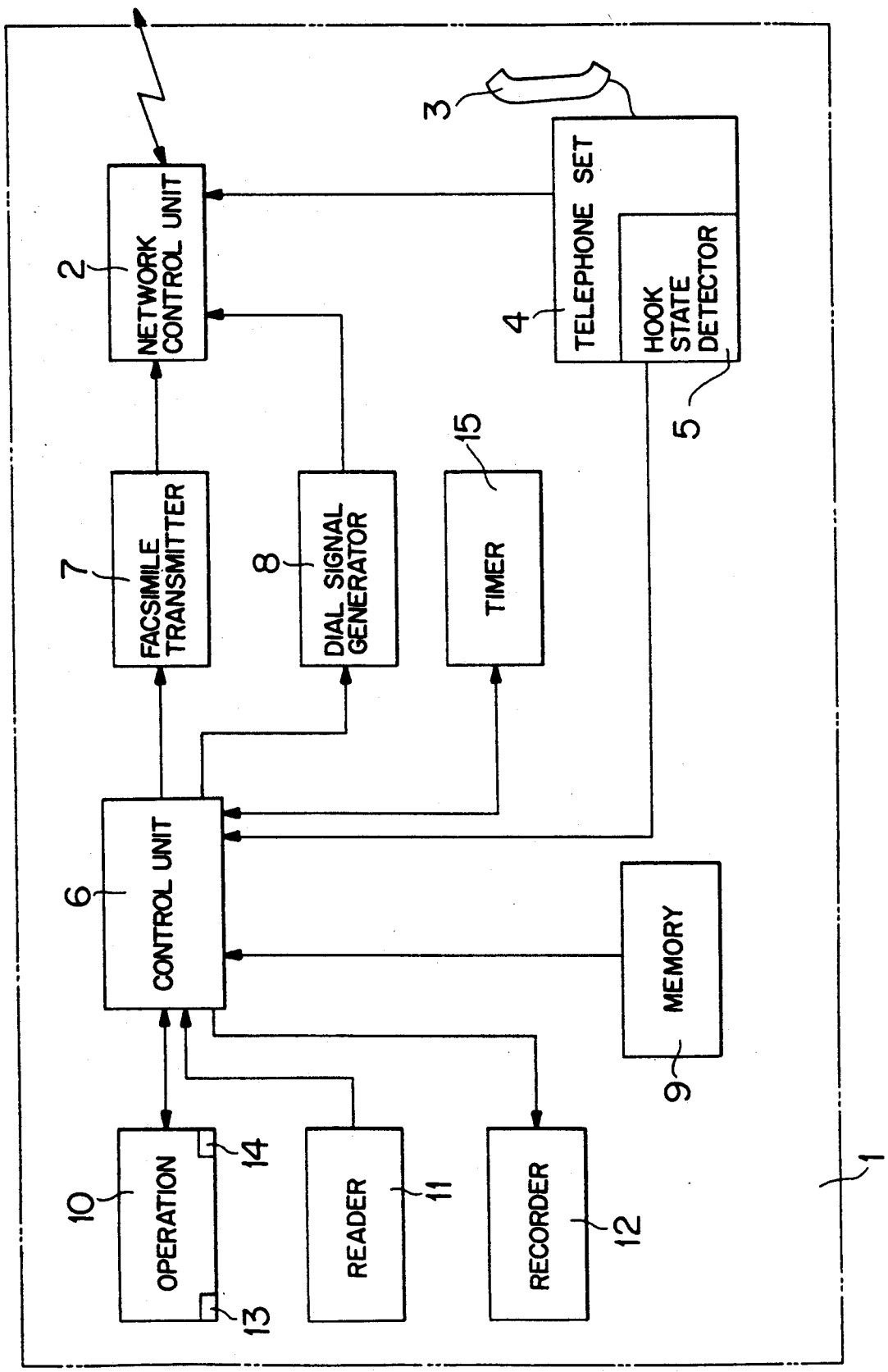
FIG. 2 is a block diagram of a communication apparatus 1 of an embodiment of the invention which utilizes telephone line.

FIG. 2 is a block diagram showing the basic structure of the communication apparatus 1 of an embodiment of the invention which utilizes telephone line. The communication apparatus 1 is provided with a network control unit 2 which is connected to the telephone line. The network control unit 2 performs network control operation between the telephone line and the communication apparatus 1. Connected to the network control unit 2 is a telephone unit 4 for oral communication which is provided with a handset 3 incorporating a microphone and a speaker. The telephone unit 4 is provided with a hook state detector unit 5 which is connected to a control unit 6.

A facsimile transmitting means 7 and a dialer circuit 8 are provided between the control unit 6 and the network control unit 2. The facsimile transmitting means 7 modulates carrier signals which are transmitted by the communication apparatus 1 via the telephone line. The dialer circuit 8 performs dialing of a telephone number, which is stored in a memory 9 to be described later, or a telephone number which is entered through an operating unit 10 to be described later. The memory 9 stores destination telephone numbers each of which is associated with a corresponding compressed dial number of a relatively small number of digits (2 digits in this embodiment), and is connected to the control unit 6.

Connected to the control unit 6 are the operating unit 10, consisting of a set of dial number keys 13, TELEPHONE key, FAX key 14 which is operated to make facsimile transmission, etc., a reading means 11 which optically reads the image of a text being set on the communication apparatus 1, recording means 12 which records the image information received via the telephone line and a timer 15 which performs time counting operation for a predetermined period of time since the completion of the dial number key operation.

Figure 3:
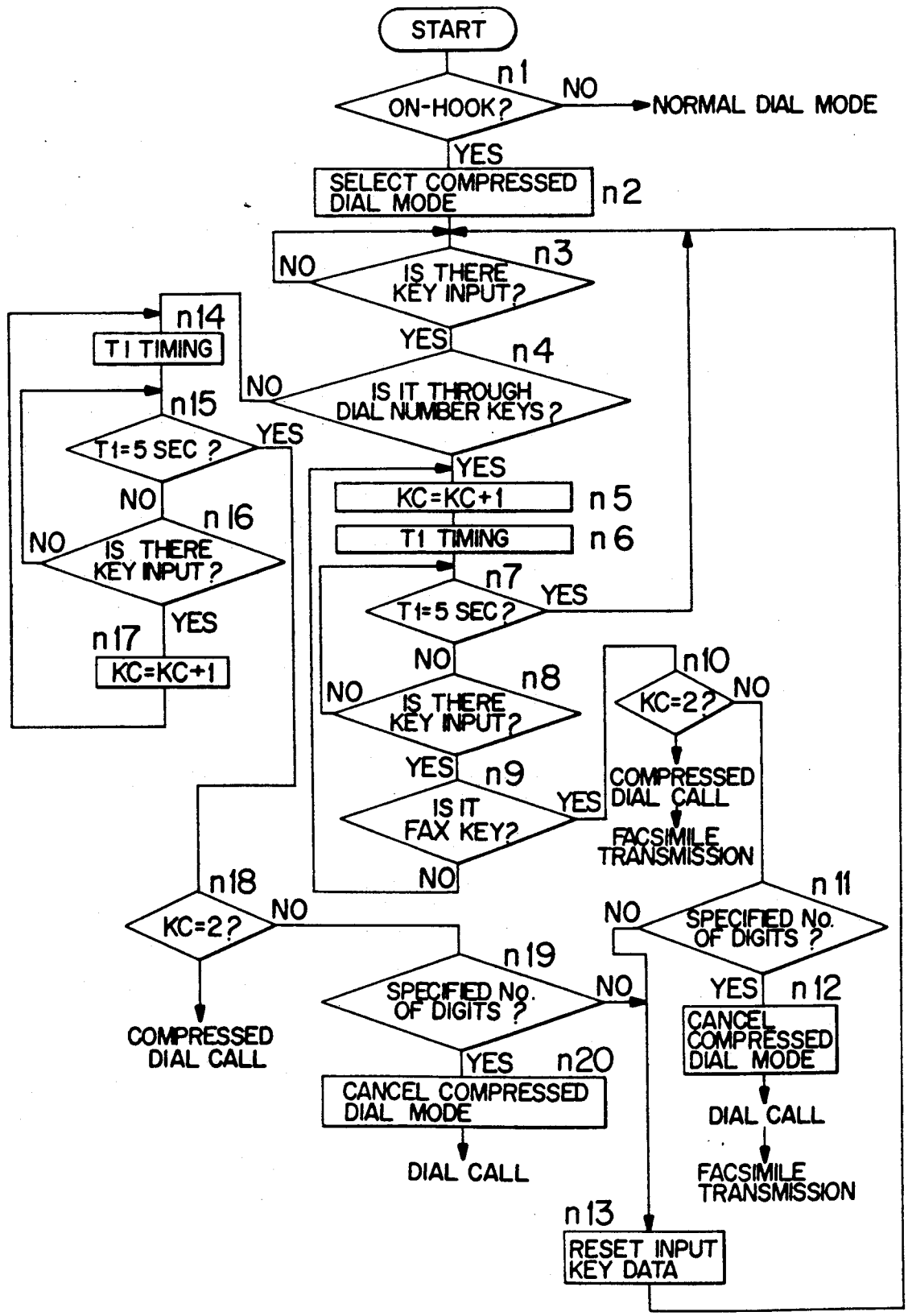
FIG. 3 is a flow chart explaining calling operation in the communication apparatus 1 shown in FIG. 2.

FIG. 3 is a flow chart explaining the calling operation performed in the communication apparatus 1. First it is determined at step n1 whether the handset 3 is in on-hook state or not. In case the handset 3 is on-hook, the operation proceeds to step n2 or, in case the handset 3 is off-hook, the apparatus enters the normal dial calling mode.

In case the handset 3 is on-hook state at step n1, the apparatus enters compressed dial mode at step n2. At step n3, whether key input has been made or not is determined. In case key input has been made, the operation proceeds to step n4 or, in case key input has not been made, the operation returns to step n3 to wait for key input. At step n4 key input data is checked to see whether it has been entered through the dial number keys 13. In the case of dial number keys 13, the operation proceeds to step n5 or, in case it has not been entered through the dial number keys 13, the operation proceeds to step n14.

In case the keys operated at step n4 were dial number keys 13, at step n5 key count KC is incremented by 1 which is a parameter representing the count of the time the dial number keys 13 were pressed. Then time counting for predetermined limit time T1 by the timer 15 is started at step n6.

At step n7, whether the limit time T1 (5 seconds, for example) has elapsed or not is determined and, in case the limit time T1 has not elapsed, the operation proceeds to step n8 or, in case the limit time T1 has elapsed, the operation returns to step n3. At step n8, whether key input has been made or not is determined. In case no key input has been made, the operation returns to step n7 or, in case key input has been made, the operation proceeds to step n9.

At step n9, the key input data is checked to see whether it is made through the FAX key 14. In case the input has been made through the FAX key 14, the operation proceeds to step n10 or, in case the input has not been made through the FAX key 14, the operation returns to step n5. At step n10, the key count KC is checked to see whether its value is 2 or not and, when the key count KC is 2, dial call with compressed number is performed followed by facsimile transmission operation being performed. In case the key count KC is not 2 at step n10, the operation proceeds to step n11 where the key count KC is checked to see whether it has a specified number of digits. In case the key count KC is the specified number of digits, the operation proceeds to step n12 where compressed dial mode is canceled and dial calling is performed followed by facsimile transmission performed. In case the key count KC is not the specified number of digits at step n11, the operation proceeds to step n13 where the key input data is reset thereupon the operation returns to step n3.

When the input has not been made through the dial number keys 13 at step n4, in the case of TELEPHONE key for example, the operation proceeds to step n14 where time counting of the limit time T1 is started. At step n15, it is checked whether the limit time T1, 5 seconds for example, has elapsed or not. When the limit time T1 has not elapsed, the operation proceeds to step n16 or, in case the limit time T1 has elapsed, the operation proceeds to step n18. At step n16 whether key input has been made or not is determined. In case no key input has been made, the operation returns to step n15 and in case key input has been made, the operation proceeds to step n17 where the key count KC is incremented by 1.

In case limit time T1 has elapsed at step n15, the operation proceeds to step n18 where key count KC is checked to see whether it is 2 or not. In case the key count KC is 2, compressed dial calling is carried out or, in case the key count KC is not 2, the operation proceeds to step n19. At step n19 the key count KC is checked to see whether it is a specified number of digits. In case the key count KC is the specified number of digits, the operation proceeds to step n20 where compressed dial mode is canceled and dial calling is performed. In case the key count KC is not the specified number of digits at step n19, the operation proceeds to step n13 where it resets the key input data and returns to step n3.

As described above, the comunication apparatus 1 is set in compressed dial mode when the handset 3 is on-hook or it is set in normal dialing mode when the handset 3 is off-hook.

FIG. 4 is a flow chart explaining an example of key operation with compressed dial number in the communication apparatus 1. FIG. 4 (1) shows an example of key operation to make oral communication by compressed dialing. When TELEPHONE key is pressed at step d1, "0" key is pressed at step d2, and "2" key is pressed at step d3, then dial call is placed for the destination telephone number corresponding to the compressed dial number "02".

FIG. 4 (2) shows an example of key operation to perform facsimile transmission with compressed dialing. When "1" key is pressed at step el, "5" key is pressed at step e2, and FAX key 14 is pressed at step e4, then dial call is placed for the destination telephone number corresponding to the compressed dial number "15", followed by facsimile transmission being performed.

In order to make oral communication by normal dialing in on-hook state in the communication apparatus 1, it is enough to press the TELEPHONE key and then operate the dial number keys 13 to enter the destination telephone number. Facsimile transmission is similarly made by simply entering the destination telephone number through the dial number keys 13 and then pressing the FAX key 14.

In the communication apparatus of this embodiment, as will be clear from the above explanation, key strokes required to place telephone call or make facsimile transmission by means of compressed dial number can be reduced from 4 to 3. Thus it is made possible to carry out key operation accurately and quickly, thereby improving the operability of the communication apparatus 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus for use with telephone lines which comprises:
   a memory which stores destination telephone numbers each paired with corresponding numbers of relatively small number of digits,
   a hook state detecting means for detecting the, on-hook or off-hook state, of a handset,
   a set of dial number keys for inputting the destination telephone numbers, when the dial number key are operated on on-hook state, a calling operation performed for the corresponding destination telephone number with reference to the data stored in the memory
   a handset for performing a telephone communication function,
   a means for performing a facsimile transmission including a key,
   a timer for performing a counting operation for a predetermined time after completion of operation of the dial number keys in an on-hook state,
   said key for the facsimile transmission means activating facsimile transmission during the counting operation of the timer, and
   means for performing the telephone communication function during the counting operation of the timer when the facsimile transmission means is not actuated.

2. The communication apparatus as claimed in claim 1 further including means for determining a key count after said key for the facsimile transmission key has been activated;
   means for judging whether the key count has a specified number of digits and when the means for judging judges that the key count is not 2; and
   means for cancelling a compressed dial mode when dial calling followed by facsimile transmission when the key count has a specified number of digits.

3. The communication apparatus as claimed in claim 1 further included means for determining if the value of a key count is other than 2 when the predetermined time has lapsed and then determining a specified number of digits,
   means for cancelling a compressed dial mode, and
   means for performing dial calling.

* * * * *